(12) United States Patent
Perez-Ramirez et al.

(10) Patent No.: US 12,047,167 B2
(45) Date of Patent: Jul. 23, 2024

(54) FEATURE DETECTION IN COLLABORATIVE RADIO NETWORKS

(71) Applicant: Intel Corporation, Santa Clara, CA (US)

(72) Inventors: Javier Perez-Ramirez, North Plains, OR (US); Ravikumar Balakrishnan, Beaverton, OR (US); Dave A. Cavalcanti, Portland, OR (US); Roya Doostnejad, Los Altos, CA (US); Mikhail T. Galeev, Portland, OR (US); Maruti Gupta Hyde, Portland, OR (US); Yiting Liao, Sunnyvale, CA (US); Alexander W. Min, Portland, OR (US); Venkatesan Nallampatti Ekambaram, San Diego, CA (US); Mi Park, San Jose, CA (US); Mohammad Mamunur Rashid, Hillsboro, OR (US); Vallabhajosyula S. Somayazulu, Portland, OR (US); Srikathyayani Srikanteswara, Portland, OR (US); Feng Xue, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/253,062

(22) PCT Filed: Sep. 27, 2018

(86) PCT No.: PCT/US2018/053125
§ 371 (c)(1),
(2) Date: Dec. 16, 2020

(87) PCT Pub. No.: WO2020/068084
PCT Pub. Date: Apr. 2, 2020

(65) Prior Publication Data
US 2021/0281356 A1    Sep. 9, 2021

(51) Int. Cl.
*H04L 1/00* (2006.01)
*G06N 3/045* (2023.01)
(Continued)

(52) U.S. Cl.
CPC .......... *H04L 1/0003* (2013.01); *G06N 3/045* (2023.01); *G06N 3/08* (2013.01); *H04L 1/0009* (2013.01);
(Continued)

(58) Field of Classification Search
None
See application file for complete search history.

(56) References Cited

U.S. PATENT DOCUMENTS

| 11,624,822 B2 * | 4/2023 | Stokes | G01S 7/6272 |
| | | | 367/88 |
| 2002/0094531 A1 * | 7/2002 | Zenhausern | C12Q 1/686 |
| | | | 702/19 |

(Continued)

FOREIGN PATENT DOCUMENTS

| CN | 106485209 | 3/2017 |
| CN | 112956146 | 6/2021 |

(Continued)

OTHER PUBLICATIONS

"International Application Serial No. PCT/US2018/053125, International Search Report dated Jun. 27, 2019", 3 pgs.

(Continued)

*Primary Examiner* — Phirin Sam
(74) *Attorney, Agent, or Firm* — Schwegman Lundberg & Woessner, P.A.

(57) ABSTRACT

A method can be performed by a first node for determining a parameter of physical (PHY) layer circuitry of a second node. The method can include implementing a cascaded hierarchy of techniques to determine, based on an electrical (Continued)

signal from a second node, a parameter of the PHY layer circuitry of the second node, and causing an antenna of the first node to transmit an electromagnetic wave consistent with the determined parameter.

19 Claims, 8 Drawing Sheets

(51) Int. Cl.
*G06N 3/08* (2023.01)
*H04W 28/04* (2009.01)
*H04W 16/14* (2009.01)
*H04W 74/0808* (2024.01)

(52) U.S. Cl.
CPC .......... *H04L 1/0015* (2013.01); *H04L 1/0041* (2013.01); *H04W 28/04* (2013.01); *H04W 16/14* (2013.01); *H04W 74/0808* (2013.01)

(56) References Cited

U.S. PATENT DOCUMENTS

| | | |
|---|---|---|
| 2012/0197898 A1 | 8/2012 | Pandey et al. |
| 2013/0265890 A1* | 10/2013 | Ali .................. H01Q 1/246 |
| | | 370/252 |
| 2015/0193696 A1 | 7/2015 | Vasseur et al. |
| 2016/0261615 A1 | 9/2016 | Sonnenberg et al. |
| 2016/0350651 A1 | 12/2016 | Devarajan et al. |
| 2017/0318618 A1* | 11/2017 | McCormack .......... H04W 76/10 |
| 2018/0091981 A1 | 3/2018 | Sharma et al. |
| 2019/0137618 A1* | 5/2019 | Hawker .................. G01S 19/45 |
| 2022/0167133 A1* | 5/2022 | Kraeling ................. H04W 4/48 |

FOREIGN PATENT DOCUMENTS

| | | |
|---|---|---|
| KR | 20180034395 A | 4/2018 |
| WO | 2017134490 | 8/2017 |
| WO | WO-2020068084 A1 | 4/2020 |

OTHER PUBLICATIONS

"International Application Serial No. PCT/US2018/053125, Written Opinion dated Jun. 27, 2019", 6 pgs.

"European Application Serial No. 18935170.3, Extended European Search Report dated May 20, 2022", 9 pgs.

"International Application Serial No. PCT US2018 053125, International Preliminary Report on Patentability dated Apr. 8, 2021", 9 pgs.

* cited by examiner

FEATURE DETECTION IN COLLABORATIVE RADIO NETWORKS

This patent application is a U.S. National Stage Filing under 35 U.S.C. 371 from International Application No. PCT/US2018/053125, filed Sep. 27, 2018 and published in English as WO 2020/068084 on Apr. 2, 2020, which is hereby incorporated by reference herein in its entirety.

TECHNICAL FIELD

Aspects described herein pertain in general to identifying features (e.g., physical layer (PHY) or link layer (sometimes called medium access control (MAC)). In some aspects, the feature detection may include one or more neural networks or other techniques to identify the features of the layer. In one or more aspects, the techniques can be cascaded to identify the features of the layer.

BACKGROUND

In Collaborative Intelligent Radio Networks (CIRN), no prior information is shared between participants before their operation in the network. One node for each participant's network serves as a gateway, and collaboration is enabled over an internet-like infrastructure connected to the gateway nodes for all teams. IP traffic of multiple types is given to each node, with sources and destinations contained in the same team's network.

Detection of PHY layer features of incoming wireless signals is of high importance when collaborating with other participants in CIRNs. In addition to accurate detection of expected signal, sensing techniques can also require learning and adapting to new environments in which unknown wireless signals might arise. In what follows, we propose a novel sensing technique that enables both accurate detection and quick learning using a cascaded/hierarchical algorithm design.

There is a deep breadth of literature related to spectrum sensing. In a survey of different spectrum sensing expert algorithms is presented. Present different ML algorithms for spectrum sensing under different wireless system conditions. Recently, DL algorithms have been introduced to solve spectrum sensing problems.

Until recently, spectrum sensing algorithms have relied on expert/machine learning algorithms. The proposed algorithms are typically designed to detect features of specific types of wireless signals and are not scalable to accommodate for new signal types and/or features.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which.

DETAILED DESCRIPTION

In the following description, for purposes of explanation, numerous specific details are set forth in order to provide a thorough understanding of some example aspects. It will be evident, however, to one skilled in the art, that the present disclosure may be practiced without these specific details.

Aspects of this disclosure regard a variety of devices, systems, and methods for identifying features of a PHY or MAC layer of another communicatively coupled device. In some aspects, a cascaded hierarchy of techniques can be employed to identify respective features of the PHY layer. In other aspects, artificial intelligence (AI) or machine learning (ML) techniques can be used to determine a parameter of a MAC scheme.

What follows is a discussion of MAC parameter identification and communication. These aspects can be used in conjunction with or separate from the PHY layer circuitry parameter identification aspects discussed later.

Existing spectrum (e.g., 5.8 GHz) and new unlicensed spectrum (e.g., 6-7 GHz) and shared spectrum bands are being targeted by multiple wireless communication systems, including next generation WiFi/IEEE 802.11, 5G New Radio (NR), and LTE standards. Coexistence between communication systems that communicate using different protocols will occur. Existing methods for coexistence between LTE and WiFi are based on listen-before-talk without any cooperation or learning between systems.

Existing methods are slow and can be ineffective in some situations. Furthermore, no coexistence/cooperation mechanism has been proposed for 5G NR systems and existing systems (e.g., WiFi, LTE, or other wireless communication system). Interference can be quite high between different schemes if there is no intelligence for sharing bandwidth. Quality of service (QoS) and throughput is thereby affected.

New systems (e.g., Defense Advanced Research Projects Agency (DARPA) fixed wireless, among others) with different MAC schemes may not be known by other systems, so interference and other non-predictable issues can result. LTE and unlicensed devices can compete on the same spectrum, and current methods for handling this are not effective. A MAC scheme provides one or more of flow control, multiplexing, or the like.

Figure 1:
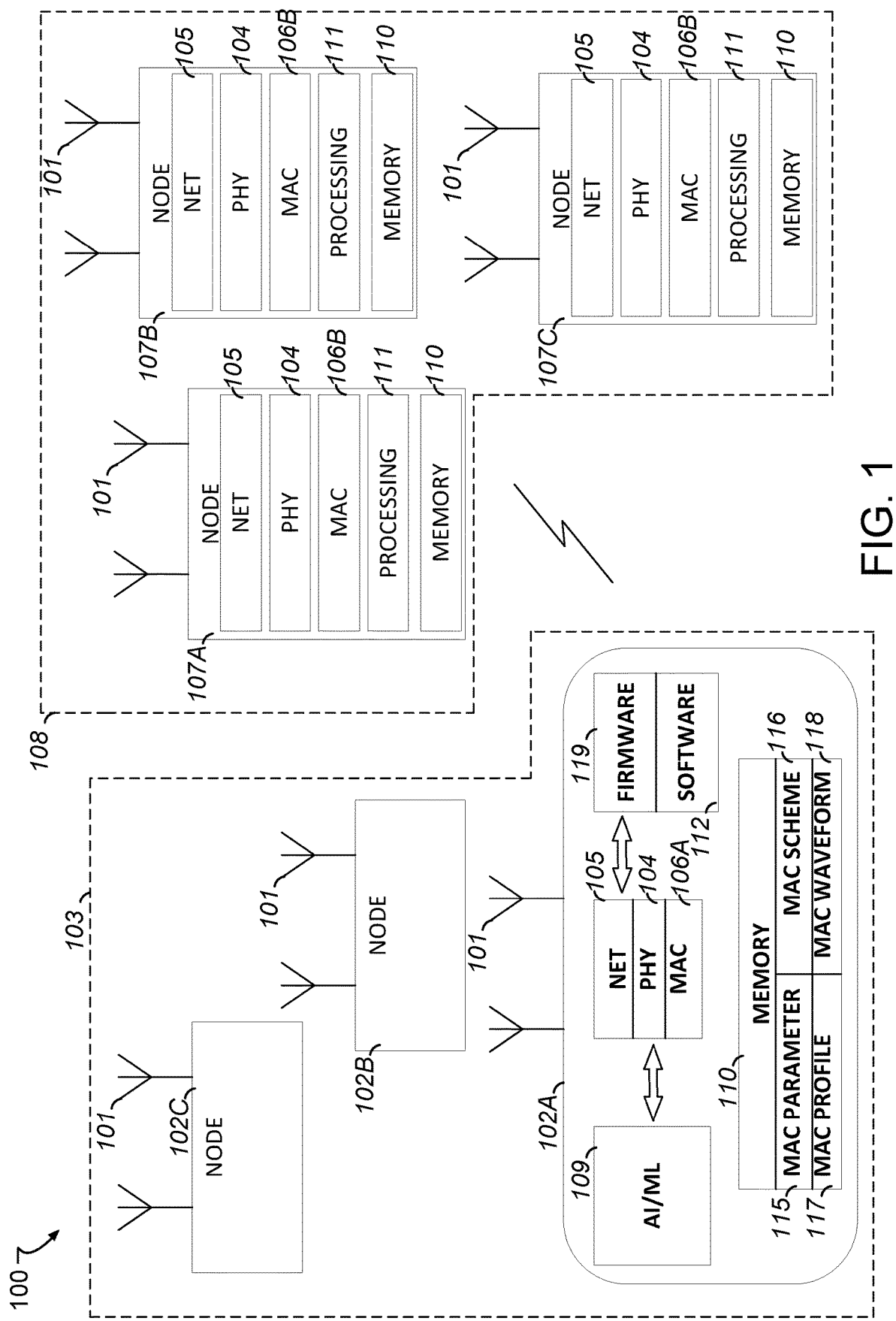
FIG. 1 illustrates, by way of example, a diagram of an aspect of a system for coexistence or collaboration between nodes with heterogeneous communication protocols.

FIG. 1 illustrates, by way of example, a diagram of an aspect of a system 100 for coexistence or collaboration between nodes with heterogeneous communication protocols. The nodes 102A-102C, and 107A-107C are sometimes called user equipment (UEs), access points (APs), wireless communication devices, or the like. The nodes 102A-102C, 107A-107C can include a television, sensor device, smart phone, smart appliance, vehicle, an Internet of Things (IoT) device, or the like. The nodes 102A-102C, 107A-107C can include physical layer circuitry (PHY) 104 for transmitting and receiving signals to and from the other nodes 102A-102C, 107A-107C or other devices using one or more antennas 101. The nodes 102-102C, 107A-107C can include medium access control layer (MAC) circuitry 106 for controlling access to the wireless medium. The nodes 102A-102C, 107A-107C may also include processing circuitry 111 and memory 110 arranged to perform operations for PHY or MAC parameter detection. The nodes 102A-102C, 107A-107C can include network circuitry 105, sometimes called a radio, for receiving or transmitting (e.g., a transceiver) for controlling the antennas 101.

The antennas 101 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) aspects, the antennas 101 can be effectively separated to take advantage of spatial diversity and the different channel characteristics that can result.

Although the nodes 102A-102C, 107A-107C can each be illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Aspects can be implemented in one or a combination of hardware, firmware and software. Aspects can also be implemented as instructions stored on a computer-readable storage device, which can be read and executed by at least one processor or other processing circuitry to perform the operations described herein. A computer-readable storage device can include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some aspects may include one or more processors and can be configured with instructions stored on a computer-readable storage device.

In accord with aspects, the nodes 102A-102C, 107A-107C can be configured for performing one or more of the methodologies for PHY layer parameter identification or MAC layer parameter identification discussed herein.

The system 100 includes one or more nodes 102A, 102B, or 102C in a first group of nodes 103 and one or more nodes 107A, 107B, or 107C in a second group of nodes 108. The group of nodes 103 communicates using a first scheme implemented by MAC circuitry 106A that is different from a second scheme implemented by MAC circuitry 106B used by the second group of nodes 108.

Aspects can include detecting, at one or more of the nodes 102A-102C, a MAC scheme used by nodes 107A-107C within communication range and identify collaborative/cooperative techniques for converging on a multiple access scheme to be used in communication (this could also be MAC intra team vs MAC inter team). Aspects can learn, by AI/ML circuitry 609 and adapt to a converged MAC scheme based upon environment, density of nodes, traffic patterns, load, etc. The nodes 102A-102C can use active probing (e.g., by transmitting a few times to understand a reaction of the other nodes 107A-107C). Reinforcement learning techniques can be used by the AWL circuitry 109.

Aspects are more robust and faster, with improved throughput and QoS as compared to prior MAC negotiation and communication techniques. The AWL circuitry 109 can help learn a new MAC scheme (e.g., DARPA, LTE, Wi-Fi, NR, a combination thereof, or some MAC protocol therebetween, or others that have not yet been developed). The AWL circuitry 109 can help improve the robustness of current LTE and unlicensed spectrum sharing techniques.

The system 100, according to aspects, can provide improved spectral efficiency. Aspects can be applied in a CIRN, such as to share spectrum with any network(s), in any environment, and without prior knowledge.

The system 100 in FIG. 1 can help illustrate how the AWL circuitry 109 can be used, such as in a CIRN, to learn MAC parameters or protocols of the MAC circuitry 106B to be used in communication.

Each of the groups of nodes 103, 108 includes one or more nodes 102A-102C or 107A-107C, respectively. The groups of nodes 103, 108 can operate to determine a MAC scheme to use to communicate with each other. One node 102A-102C, 107A-107C for each group of nodes 103, 108 can serve as a gateway. The other, non-gateway nodes can communicate to nodes of the other group through the gateway. Collaboration can be enabled over an internet-like infrastructure connected to the gateway nodes for all the groups of nodes 103, 108. IP traffic (of multiple types) can be given to each node, with sources and destinations contained in the same groups of nodes 103, 108. All groups of nodes 103, 108 can operate in an RF environment that models, using the AWL circuitry 109 or the processing circuitry 111, path loss, multipath, Doppler, channel correlations, or noncollaborative radios (incumbents, jammers).

The scoring for performance of a group of nodes 103, 108, such as can be determined by the processing circuitry 111, can be a function of one or more scores: (1) Performance score: function of goodput (a number of useful information bits delivered by a group of nodes to a certain destination per unit of time), fairness (whether the nodes 102A-102C, 107A-107C are receiving uniform access to system resources), quality of service (QoS), or the like; (2) Collaboration score: function of one or more of performance scores of other groups of nodes 103, 108, resistance to jammers, or interference to incumbents.

The AWL circuitry 109 can produce data indicating a MAC scheme of a plurality of MAC schemes most likely to be used by another group of nodes 103, 108. The processing circuitry 111 can identify a collaborative/cooperative technique for converging on a same MAC scheme as another group of nodes 103, 108 based on the MAC scheme indicated by the AWL circuitry 109 and the scheme implemented by the MAC circuitry 106A. Methods can be implemented on an intra-team or inter-team basis, such as between nodes 102A-102C or between nodes 102A-102C and 107A-107C. The AWL circuitry 109 can learn and adapt the converged MAC scheme based upon environment, density of nodes, traffic patterns, load, a combination thereof, or the like. Systems and methods according to aspects can perform active probing (e.g., by transmitting a few times to understand the other team's reaction). In other aspects, reinforcement learning techniques can be applied.

As previously discussed, existing (5.8 GHz) and new unlicensed (6-7 GHz) and shared spectrum bands are being targeted by multiple wireless communication systems, including next generation Wi-Fi/IEEE 802.11, 5G New Radio (NR) and LTE standards. Existing methods for coexistence between LTE and Wi-Fi are based only on listen-before-talk without any cooperation or learning between systems. Furthermore, no coexistence/cooperation mechanism has been proposed for 5G NR unlicensed systems and existing systems (Wi-Fi and LTE). One example scenario is an enterprise network or a factory network where the operator may deploy different technologies in the same space to cover different applications (IT, automation, sensor networks). Generally, the frequency bands of 5G NR, LTE and WiFi systems do not overlap on the same bands. However, is Licensed Assisted Access (LAA) where LTE is deployed in the same unlicensed bands as WiFi and there is a lot of potential for 5G NR unlicensed spectrum to overlap with current LTE, WiFi or other bands.

The AWL circuitry 109 can detect the presence of a co-existing system through learning of the waveforms. The AWL circuitry 109 can implement a deep-learning, or other neural network (NN) in one or more aspects. The NN can be trained on example waveforms. The NN can then use an incident waveform as input to classify the waveform. In this manner, the type of MAC scheme used by the MAC 106A, 106B can be detected.

Learning waveforms can include, in some aspects, maintaining a global list of systems and their waveforms 118 in the memory 110 that could be used for communication. The AWL circuitry 109 can be trained, a priori or after deployment, to be able to classify a waveform incident on the antenna 101 into a system/communication type, such as by using the global list in the memory 110.

In some aspects, a collaboration channel (CC) (e.g., one or more dedicated sub-channels) can be used for communication between groups of nodes 103, 108 with heterogeneous MAC schemes. In some aspects, a cross-technology communication (CTC) can be used. The CTC can complement to a control channel, wherein heterogeneous technologies are communicating directly using a variety of schemes, such as can include a wave form emulation, shifting of timings of periodic beacon frames, or the like.

Aspects can enable discovery of 5G NR radios by existing/legacy Wi-Fi/LTE radios through a (new) backward compatible signal. New signaling to enable inter-system discovery can be included in a future standard. Such signaling may be defined as a control message (e.g., a beacon frame in 802.11, or the like) or a known reference signal (e.g., demodulation reference signal (DMRS), cell specific reference signal (CRS), channel state information reference signal (CSI-RS), or the like, as in LTE and 3GPP systems). Similarly, WiFi signals could be detected, such as by using beacons and the preamble. LTE signals could be detected using the synchronization signals (e.g., primary synchronization signals (PSS) or secondary synchronization signals (SSS), or the like).

In some aspects, the signaling can be based on Zadoff-Chu sequences. The Zadoff-Chu sequences can be backward compatible to existing LTE radios. Further, these sequences can be modulated with another code that is decodable by only the nodes 102A-102C, 107A-107C belonging to a same group of nodes 103, 108. An example of such a modulation could be such as done using a global position system (GPS) where there is a civilian code superimposed over a military code. The military code can only be decoded by military receivers while the civilian code is decodable by commercial GPS receivers and military receivers.

In some aspects, the network circuitry 105 can adjust a listen-before-talk parameter based on the communication patterns learned by the AWL circuitry 109 from co-existing systems (e.g., adjust the time for clear channel assessment, adjust the backoff procedure, adjust packet size/fragment packets to take advantage of free channel time without collisions, or the like).

Some aspects can limit the set of possible schemes (MAC schemes/PHY schemes) that all nodes 102A-102C, 107A-107C or groups of nodes 103, 108 can use to communicate with one another. Some common MAC scheme types include: (i) Random access based: CSMA, Aloha, or the like; and (ii) Collision-free methods: time domain multiple access (TDMA), code division multiple access (CDMA), frequency domain multiple access (FDMA), orthogonal frequency domain multiple access (OFDMA), or the like.

Data structures/features can be used to describe/characterize the general MAC framework being currently utilized by a node. Some of the parameters may include: a) Collision-free or contention-based (e.g., Boolean); b) Collision-based type (e.g., unsigned integer): carrier sense multiple access with collision avoidance (CSMA/CA), carrier sense multiple access with collision detection (CSMA/CD), Aloha, Slotted Aloha; c) Collision-free types (e.g., unsigned integer): TDMA, CDMA, FDMA, OFDMA, or the like; d) Time-slot unit (e.g., unsigned integer): integer multiple of the basic unit of overall system; e) Frequency/subcarrier spacing (unsigned integer): multiple of basic unit of the overall system; or f) Retransmission attempts (e.g., unsigned integer).

The nodes 102A-102C, 107A-107C can identify a parameter 115 (sometimes called a feature at least regarding NN aspects) of the waveform, such as to help describe/characterize the MAC scheme 116 used by the transmitting node. The parameter 115 can include one or more of: a) Code set arrangement (e.g., how the access codewords divide into subsets) in CDMA access method; b) Beamforming codeword subsets (e.g., how the beamform vectors divide into subsets for spatial access), in multiple input multiple output (MIMO) or spatial division multiple access (SDMA), i) Channel bandwidth access behavior and usage statistics (e.g., in 802.11 devices can use different channel bandwidth 20/40/80/160 Mhz depending on their availability based on CCA (clear channel assessment)); or c) In general, a node can combine space, time, and frequency access parameters.

Because there are only a limited number of mechanisms for medium access (TDD, FDD, or the like), a first detection can be used to detect that mechanism. Once the mechanism is determined, another test can be used to detect the various parameters (or a limited number of key parameters) around the MAC (backoff range, time-sharing period (for TDD), frequency (for FDD), etc.). A cascaded technique architecture, like those described elsewhere herein can be used to determine these MAC characteristics.

The nodes 102A-102C, 107A-107C can perform MAC detection periodically, or once on power-up and periodically thereafter, or upon detection of deterioration in conditions, or the like. Aspects can use pre-selected communication profiles 117 and match to one of the profiles based on detected signaling. Communication profiles 117 are related to the schemes as defined above. These profiles 117 can be stored in the memory 110. The profiles 117 define the MAC scheme to use for communication between heterogeneous nodes while the MAC schemes 116 indicate a MAC scheme used by another node 102A-102C, 107A-107C.

The communication can proceed according to the identified or detected scheme. For example, the AUML circuitry 109 can identify a scheme based on a waveform. The processing circuitry 111 can then lookup a profile based on the identified scheme. The nodes 102A-102C, 107A-107C can then communicate (e.g., the gateway of the group of nodes 103, 108) using the identified scheme. In some aspects, only the gateway needs to determine a MAC scheme with which to communicate and all communication from nodes 102A-102C, 107A-107C of the group of nodes 103, 108 to a destination outside the group of nodes 103, 108. In other aspects, more than one node 102A-102C, 107A-107C can alter their MAC scheme to communicate with nodes 102A-102C, 107A-107C of another group of nodes 103, 108 directly.

Training of the AWL circuitry 109 can be performed based on the schemes that are known, such as by comparing observed parameters to the known scheme parameters 115. One or more nodes 102A-102C, 107A-107C can determine what the other group of nodes 103, 108 is using through classification, if not through the collaboration channel. In some aspects, one or more parameters of the MAC profile 117 can be fixed or agreed upon globally or one or more parameters of the MAC profile 117 can be learned.

A collaboration channel is a dedicated channel. The dedicated channel can include a dedicated frequency band. Protocols for communication over the collaboration channel can be determined a priori. The communication protocol can be known by nodes with access to the collaboration channel. The frequency band for the collaboration channel can be different than frequency bands over which the PHY operates. The collaboration channel can be used to share information directly about parameters such as type of technology (e.g., LTE, WiFi, NR, DARPA, or the like), bandwidth, center frequency, or the like. In some aspects, the collaboration channel can be used instead of learning the parameters. Using the collaboration channel can make it faster to identify a MAC or PHY scheme for communication. The collaboration channel can be a designated band, such as in an unlicensed space. The collaboration channel can be used for sending information about a MAC or PHY protocol at some periodicity, such as using a generic broadcast protocol.

The tradeoff for having more global parameters for cross-group communication versus more learned parameters is flexibility versus speed. For example, if all parameters are fixed globally, learning would be very fast (nearing zero) but there would be no or minimal flexibility. In some aspects one or more parameters are fixed globally so that minimal communications and learning can be performed. For example, whether to use a time-domain scheme or frequency domain scheme can be set globally, otherwise no learning can take place because even basic communication could not take place. If too many parameters are learned, rather than fixed globally, signaling overhead may be very high and learning parameters can become computationally expensive. Other globally-fixed parameters can include units of measurement, units of resources, minimum slot duration (or other minimum values), or the like. It should also be considered that the collaboration channel may have relatively low bandwidth or throughput capability and therefore a compromise can need to be made between globally-fixed and learned parameters.

In some aspects, rather than (or in addition to) using a collaboration channel, a database to facilitate information sharing can be deployed which will expose application programming interfaces (API) to provide a set of operating parameters related to the MAC schemes of existing devices. When a node 102A-102C, 107A-107C begins operating, the APIs can be called to contact the database to read those parameters. Through standardization or common agreement, a set of operating parameters can be defined that every device sharing spectrum in a particular band has to store in the collaboration database. The API can be a part of the firmware 119 or software 112.

Spectrum sharing devices can communicate via a collaboration channel or using cross-technology communication methods or to use the database. The database can include learned parameters learned by the AWL circuitry 109 that can accelerate the spectrum sensing engine of other devices in the current deployment environment.

In aspects, nodes 102A-102C, 107A-107C can actively listen for signals while probing or in normal transmission because of the improved ability to learn the impact of their transmissions on other nodes by using full duplex operation. This can speed learning and help nodes react more quickly. Full-duplex can also allow devices to adapt transmissions continuously.

Nodes 102A-102C, 107A-107C in some aspects can use an API having a common interface (with underlying differences based on radio access technology (RAT)) to probe other nodes and to determine when to access various channels.

The nodes 102A-102C, 107A-107C can implement a sensing technique using one or more expert techniques or one or more machine learning (ML) techniques to determine PHY or MAC parameters. The techniques can be cascaded, such as in a hierarchy, to provide a low complexity feature detection. The features to be detected can be features of known signals or new features from known/unknown wireless signal. Known/unknown is from the perspective of the nodes 102A-102C, 107A-107C. The nodes 102A-102C, 107A-107C can be programmed to detect certain signal parameters, these are known to the nodes 102A-102C, 107A-107C. Anything that the node 102A-102C, 107A-107C is not trained to detect before deployment is unknown.

A cascaded/hierarchical PHY parameter identification technique can reduce inference and learning time relative to other techniques. A cascaded technique can be inspired by a modem design. The cascaded technique can incorporate a modem architecture in the NN design thereby potentially leading to a better performance. Additionally, or alternatively, aspects can lower power consumption when compared to more traditional ML techniques. Aspects can enable learning of new features from known/unknown wireless signals.

In aspects, features of received wireless signals can be learned using different ML/expert techniques. One or more techniques can be trained to learn about a specific feature of the signal (modulation scheme, modulation order, forward error correction (FEC) coding, channel coding, or the like) and grouped into layers.

Figure 2:
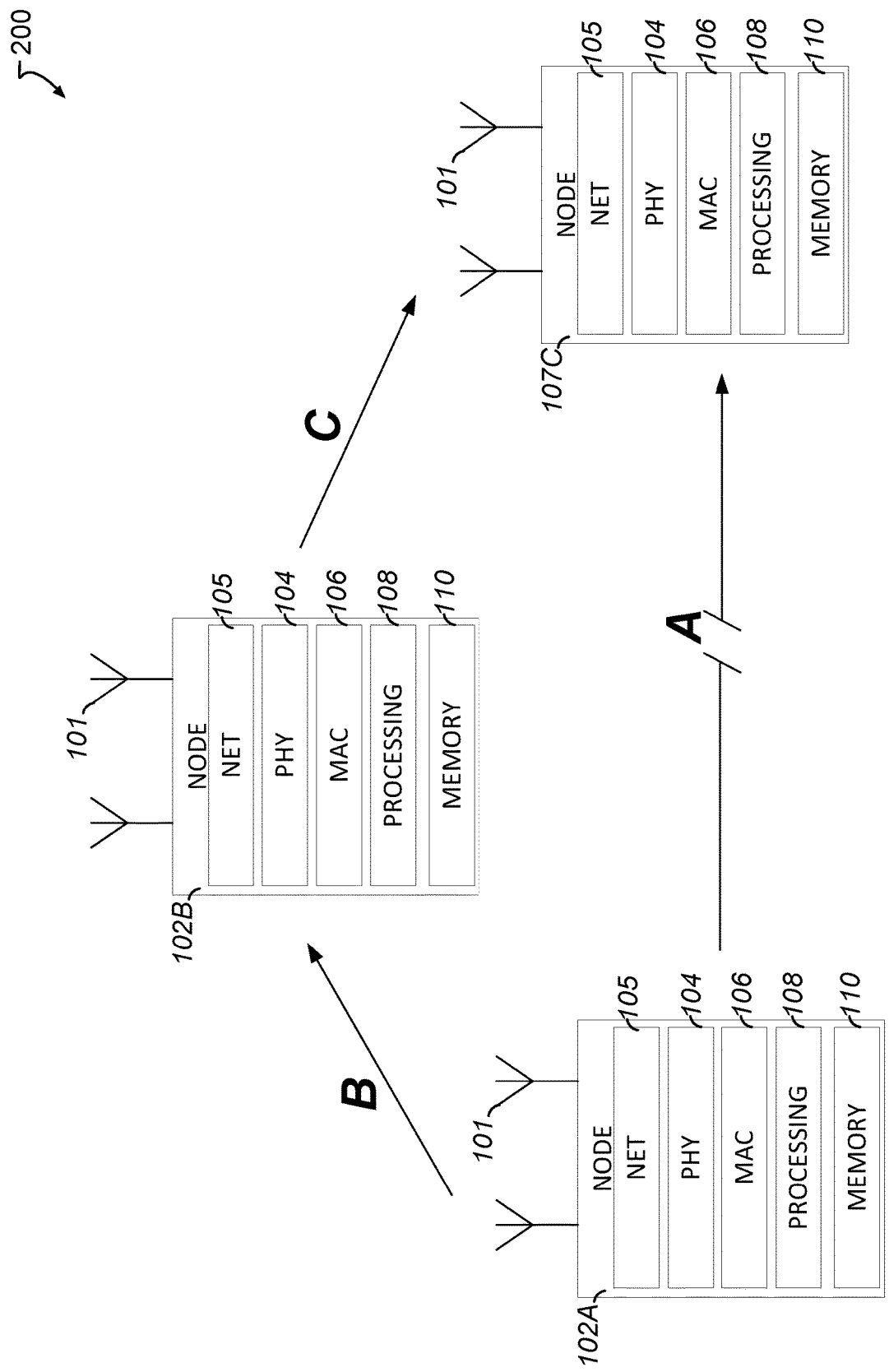
FIG. 2 illustrates, by way of example, a block diagram of an aspect of a collaborative radio network (CRN)

FIG. 2 illustrates, by way of example, a block diagram of an aspect of a portion of a collaborative radio network (CRN) 200. The CRN 200 as illustrated includes communicatively coupled nodes 102A, 102B, and 106C.

Aspects can allow for a variety of interesting use cases, such as allowing spectrum sensing in CIRN nodes. Using aspects, reliable communication between nodes 102A-102C can be achieved through an intermediate, relay node. To enable more reliable communications, one or more nodes in a CIRN can be configured as relay nodes for other CIRNs. For example, consider the nodes 102A-102C of FIG. 1.

In FIG. 1 shows an example of network where a source node 102*a* tries to communicate with a destination node 102C through the channel A. However, channel A has a likelihood of being insufficient for handling the communication. By including a relay node 102B, communications between source and destination through channels B and C is possible even when the outage probability in channel A is high.

In aspects, a relay node 102B can have no prior knowledge of the wireless transmission received at a moment in time. Thus, a cascaded technique (see FIGS. 3-5) can be used to determine details of the received transmissions, such as to enable relay approaches such as "decode-and forward" (relay operations).

Using a cascaded ML/expert technique, the relay node 102B can selectively forward massages without fully decoding received packets. For example, the node 102B can forward multi-carrier OFDM transmissions only. Another relay approach, such as "amplify-and-forward", can also benefit from cascaded ML/expert technique as it will allow to optimize a power amplifiers (PAs) mode of operation. For example, a PA's crest factor can be adjusted based of type of received signal.

Figure 3:
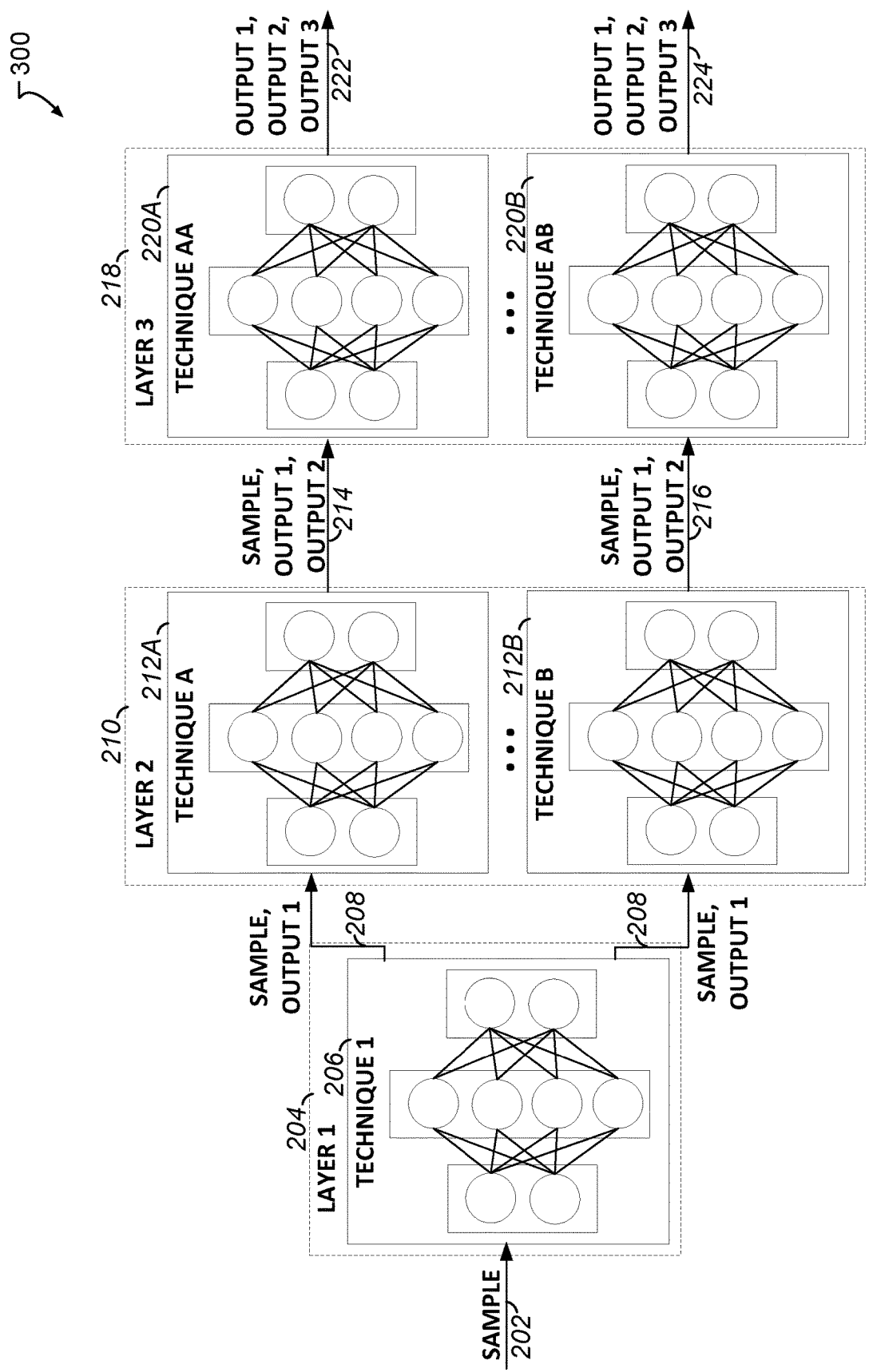
FIG. 3 illustrates, by way of example, a logical diagram of an aspect of a cascaded, hierarchical ML/expert technique for identifying PHY layer parameters.

FIG. 3 illustrates, by way of example, a logical diagram of an aspect of a cascaded, hierarchical ML/expert technique 300 for identifying PHY layer parameters. The technique 300 as illustrated includes multiple layers of techniques including a first layer 204, a second layer 210, and a third layer 218. While the technique 300 is illustrated as including three layers, two or more layers of techniques can be used.

The first layer 204 includes a first technique 206 that receives samples 202, such as from sampler circuitry of the PHY layer circuitry 104. The samples 202 can be quadrature samples, sometimes called In-phase and Quadrature (I-Q) samples. The technique 206 can include an ML or expert technique that uses the samples 202 to determine a first parameter of PHY layer circuitry 104 that produced the signal. For example, the PHY layer circuitry 104 of the node 102B can be transmitting electromagnetic waves to the node 102A. The antenna 101 can transduce the waves to a signal that can be sampled by the network circuitry 105 to generate the sample 202. The sample 202 can be provided to the processing circuitry 111 that can implement the technique 206, 212A-212B, and 220A-220B. The technique 206 can determine, for example, a modulation scheme used to produce the sample 202.

The technique 206, 212A-212B, 220A-220B can include an ML or expert technique to determine the parameter. ML is a field of computer science that uses statistical techniques to give computer systems ability to learn with data, without being explicitly programmed. There are two general types of ML, supervised learning and unsupervised learning. In supervised learning, example inputs and outputs are provided with a goal of learning a general rule that maps inputs to outputs or maps inputs to likelihoods that the inputs correspond to discrete outputs. In unsupervised learning no labels are given, leaving a program to find structure in the input. Unsupervised learning can be used to learn features of the input.

For example, an ML technique can include a neural network (NN) trained to associate modulation techniques with corresponding likelihood scores. The modulation technique associated with the highest likelihood score (e.g., and above a specified threshold) can be assumed, by the processing circuitry 111, to be the modulation technique of the PHY layer circuitry 104, thus identifying the modulation technique. In some aspects, the likelihood scores are not sufficiently high (e.g., greater than or equal to a specified threshold). This can indicate that the signal does not use any of the modulation techniques and that the NN might benefit from training to detect a new modulation technique. In modulation technique determination, training the NN can include using input-output examples of I-Q sample inputs and corresponding known modulation techniques.

An expert technique is an explicitly programmed technique. The explicitly programmed technique can include heuristics, rules, or the like to determine the parameter of the PHY layer circuitry 104. Examples of expert techniques include time correlation using a cyclic prefix to determine an orthogonal frequency domain multiplex (OFDM) boundary, a blind signal processing technique like a constant modulus algorithm (CMA), or a maximum likelihood estimation (MLE). The MLE can be based on a specification of known wireless technologies to identify the MAC scheme with known numerologies of subcarrier spacing (e.g., OFDM for LTE/802.11 ac, preambles, or sync signals).

The technique 206 can produce an output that is included as an input 208 to a next, second layer 210 of techniques 212A-212B. The second layer 210 can include technique(s) for each input 208. In an aspect, the second layer 210 can include technique(s) to identify a modulation order. The number of techniques 212A-212B can be equal to or greater than the number of possible modulation orders. Including techniques greater than the number of possible modulation orders allows a technique to be trained or programmed to identify a future, currently unknown modulation order.

The technique 212A-212B can produce an output that is included in an input 214, 216 to techniques 220A-220B in layer 3 218. The input 214 to layer 3 218 can include the outputs from each of the preceding layers (e.g., layer N can include outputs from all of layer 1 through layer N−1). In some aspects, the input to each of the layers 204, 210, and 218 can include the sample 202.

The third layer 218 can include techniques 220A-220B to determine, for example, the FEC of the sample 202. The number of techniques 220A-220B can include a technique for each possible FEC with optional additional techniques for future, currently unknown or impractical FECs. The technique 220A-220B in the third layer 218 can produce an output 222, 224. The output 222, 224 can include the results of each layer 204, 210, and 218 or the output from each layer can be provided independently. Similarly, one or more of the inputs 208, 214, 216 and samples 202 can be aggregated and provided as a single input or can be provided independently to each layer 204, 210, and 218.

Techniques in the K-th layer can improve their learning capabilities by using information extracted by techniques in layers 1, . . . , −1. In an example of PHY parameter identification, first layer 204 first detects the digital modulation of a wireless signal from received samples 202. In the next layer 210, ML/expert techniques 212A-212B detect the modulation order using the samples 202 and under the assumption of a certain digital modulation detected by first layer 204. In layer 3 218, an FEC coding scheme can be detected based on the output of the first layer 204 technique 206, layer 2 210 technique 212A-212B, and the samples 202.

Since each cascaded layer 204, 210, 218 has local input and output and is trained for a unique feature classification, it is possible to create a cascaded ML/expert technique using non-homogeneous layers 204, 210, 218. Using heterogeneous layers 204, 210, 218 within a cascaded ML/expert technique can allow for optimization of performance of each layer to a specific type of classification problem, such as to detect a single parameter of the PHY layer circuitry 104.

A motivation for such a cascaded technique stems from the underlying design of PHY layer circuitry 104 in a modem. For example, depending on the modulation technique (e.g., orthogonal frequency domain multiplexing (OFDM), single carrier frequency domain multiplexing (SCFDM), phase shift keying (PSK), frequency shift keying (FSK), amplitude shift keying (ASK), on-off keying (OOK), quadrature amplitude modulation (QAM), continuous phase modulation (CPM), or the like) the modulation order determination can widely vary and require that the inputs to the neural network be appropriately modified. If it were determined that the modulation is OFDM, for example, then to detect the modulation order, it can be beneficial to operate in the frequency domain. It is possible to train a large enough NN to determine the modulation order in the time domain, but this might increase the complexity significantly. By incorporating the knowledge of a communication modem architecture, the complexity of the techniques can be reduced and the detection capability of the system 100 can be increased.

Figure 4:
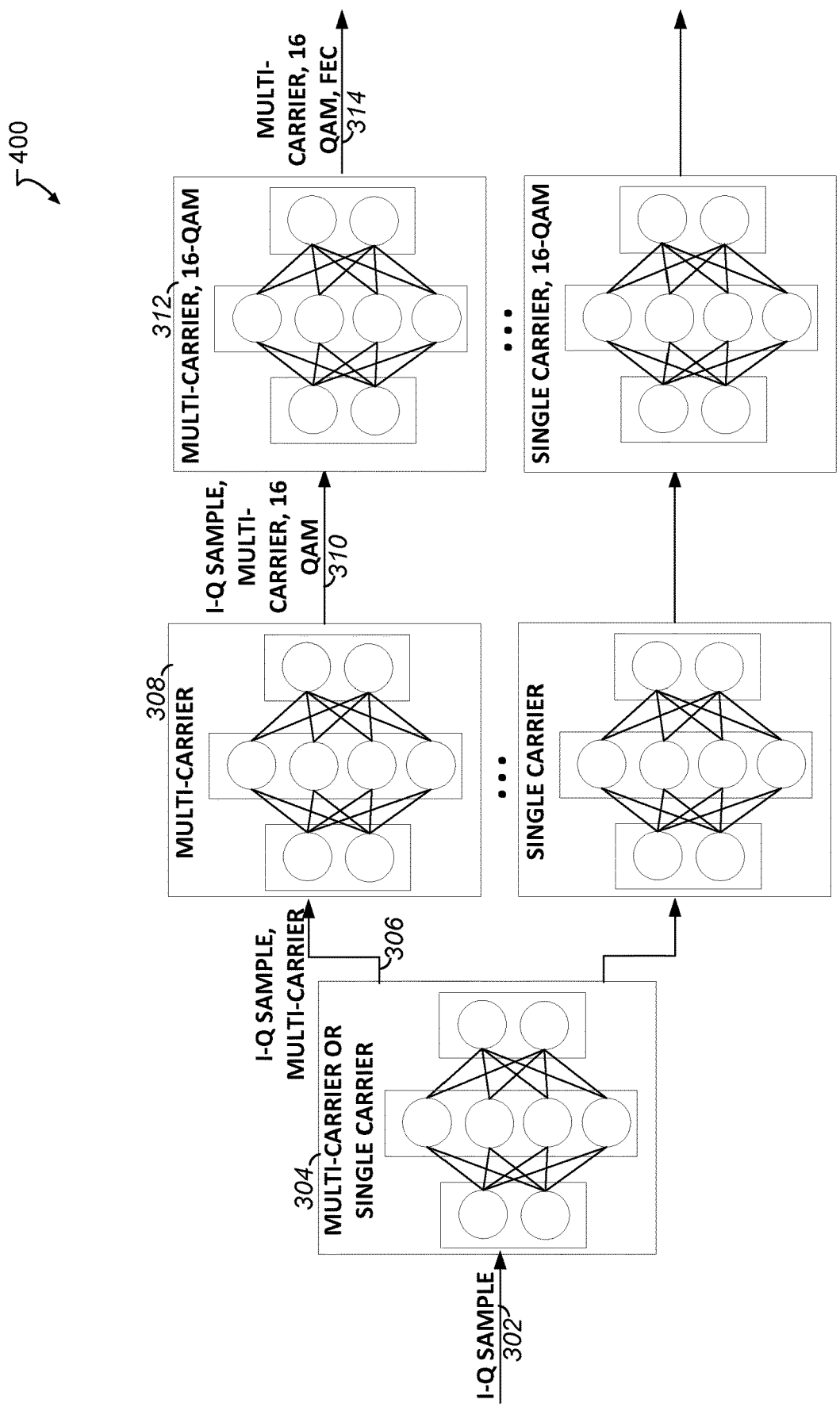
FIG. 4 illustrates, by way of example, a diagram of an aspect of a cascaded technique for identifying PHY layer circuitry parameters.

FIG. 4 illustrates, by way of example, a diagram of an aspect of a cascaded technique 400 for identifying PHY layer circuitry parameters. The technique 400 is like the technique 300, with the technique 400 including specific parameters to be detected by each layer 204, 210, and 218 (layers not illustrated in FIG. 3 to no obscure the view). In the technique 400, I-Q samples 302 are provided to a technique 304 for identifying whether a modulation scheme is a multi-carrier modulation scheme or a single carrier modulation scheme. In response to a determination by the technique 304 that the modulation scheme is more likely a multi-carrier modulation scheme than a single carrier modulation scheme, the sample 302 and data indicating that the modulation scheme is more likely a multi-carrier modulation scheme can be provided as input 306 to the technique 308.

Figure 5:
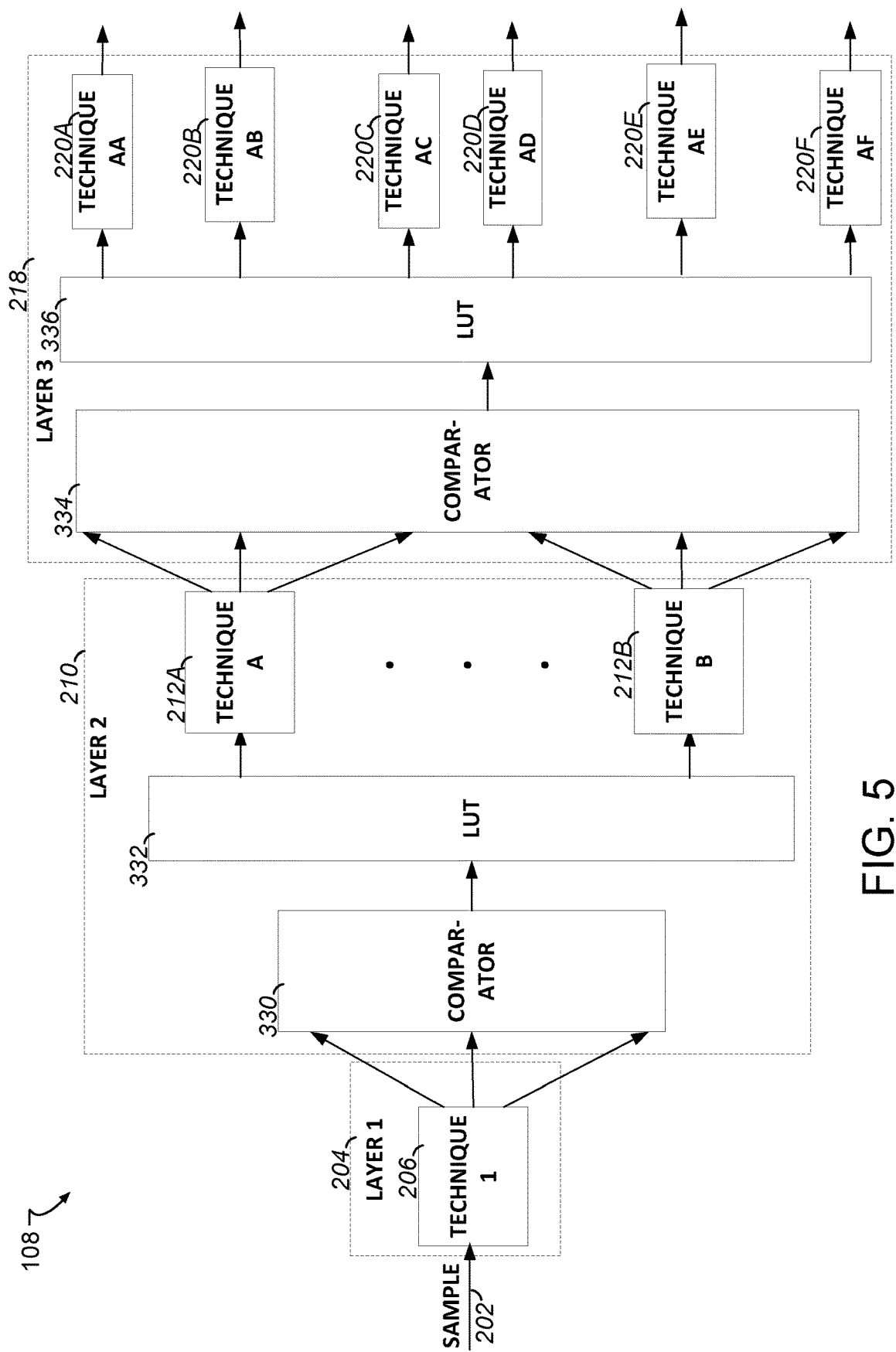
FIG. 5 illustrates, by way of example, a diagram of an aspect of processing circuitry configured for performing a cascaded hierarchical technique for PHY layer circuitry parameter identification.

In some aspects, the processing circuitry 111 can include logic or circuitry configured to select or filter one or more techniques in a subsequent layer based on a result in a previous layer. For example, a technique configured to determine a modulation order for a single carrier modulation scheme need not operate on input determined to correspond to a multi-carrier modulation scheme. FIG. 5 illustrates, by way of example, a diagram of an aspect of such filter components.

In the aspect of FIG. 4, since the sample 302 is determined to correspond to a multi-carrier modulation scheme, the sample and parameter from the technique 304 are not provided to the single carrier modulation order technique. The technique 308 determines a modulation order of the sample 302. The technique 308 (or other circuitry in the layer) can provide a result indicating the modulation scheme, modulation order, and the sample 302 as input 310 to a next layer.

A technique 312 can determine an FEC used to produce the sample 302, such as can be based on the sample 302, output of the technique 304, or output of the technique 308. The layer in which the technique 312 resides can filter which technique(s) receive the input 310 similar to how the layer in which the technique 308 resides filters the techniques to which the input 306 is provided.

Consider a situation in which a parameter of the PHY layer circuitry 104 is unknown. Training of the technique 304, 308, or 312 is only required in the layers where there is a new feature in the received wireless signal, the sample 302. Consider that, for explanation purposes, the FEC parameter is not known to the node 102A-102C. That means the node 102A-102C does not have a technique configured to detect the specific FEC used by the PHY layer circuitry 104 that produced the transmission. This can be determined, by for example, determining that a greatest score associated with an output of the technique(s) in the corresponding previous layer, is less than a threshold value or determining that the combination of outputs from the preceding layer(s) has not been accounted for in the layer.

For example, FIG. 34 shows an aspect where a multi carrier, 16 QAM signal has been received. Techniques 304 and 308 in Layers 1 and 2 have been trained to detect these parameters (for the sake of simplicity, FIG. 4 illustrate with the assumption that all techniques are formed by NNs in FIG. 4). However, layer 3 has not been trained to detect a new type of FEC coding scheme. To accomplish the detection, however, only one technique of a layer will need to be trained to detect the FEC scheme given the previously learned features. This contrasts with NNs or other techniques that attempt to determine all parameters of a transmission using a single NN or multiple parameters in a single NN.

Aspects thus allow for the detection of a subset of parameters corresponding to an unknown new type of wireless signal. The nodes 102A-102C can use this partial information to improve their overall network performance in a timely manner as they learn about this new type of signal.

FIG. 5 illustrates, by way of example, a diagram of an aspect of processing circuitry 111 configured for performing a cascaded hierarchical technique for PHY layer circuitry parameter identification. The processing circuitry 111 can receive the sample 202 from the PHY layer circuitry 104 or produce the sample 202 based on a signal received from the PHY layer circuitry 104. The technique 206 can operate on the sample 202 to produce a result indicating one or more classes. The result can indicate a corresponding value that indicates a likelihood that an associated class is the correct classification for the sample 202.

A comparator 330 can determine which class corresponds to the highest value. The comparator 330 can produce an output indicating which class is identified by the technique 206 (e.g., which class corresponds to the highest value). The output from the comparator 330 can be used to determine which technique(s) 212A-212B in the next layer is to operate on one or more of the sample 202, the output of the technique 206, or other input. In some aspects, the processing circuitry 111 can use a look up table (LUT) 332, such as can be stored in the memory 110. In other aspects, a switch network, such as can include a digital switch, digital logic (e.g., AND, OR, XOR, negate, buffer, or the like), multiplexer, or the like configured to direct the sample 202 or other input to the proper technique 212A-212B.

The layer 218 can receive one or more outputs from the technique(s) 212A-212B of the layer 210. The layer 218, similar to the layer 210, can include a comparator 334 (similar to the comparator 330) and a LUT 336 (similar to or the same LUT 332). The comparator 334 can identify a result from the technique 212A-212B that corresponds to a highest value. The result from the layer 210 (e.g., with/out the result from the layer 204) can be used to determine one or more technique(s) 220A-220F of the layer 218 to provide one or more of the result from the layer 204, the result from the layer 210, or the sample 202. In this manner, the results are filtered to only the technique(s) 212A-212B, 220A-220F for which the input is relevant. This reduces the computational complexity for a given identification, power consumption, and compute time.

Given the nature of the signals to be identified and prior knowledge of what PHY layer circuitry 104 parameters might be identified, inputs can be generated that are provided to the NNs in addition to the raw I and Q samples. For example, in an OFDM system cyclic prefixes are used. Therefore, an autocorrelation of the signal can yield periodic spikes spaced at the OFDM symbol durations. Hence, the autocorrelation function of the sample can be an input to the NN. Based on this, the input to the technique 206, 212A-212B, 220A-220F, 304, 308, or 312 can include one or more of time domain I-Q samples, Fast Fourier Transform (FFT) of the I-Q samples, autocorrelation of the I-Q samples, wavelet coefficients of the I-Q sample (e.g., Haar wavelets, Dabauchies wavelet, or the like), wavelet coefficients of the FFT of the I-Q sample, or projection of the I-Q sample onto a standard code (e.g., a Walsh-Hadamard codes, or the like). In some aspects, an input to the NN can include a complex number representative of the I and Q samples and the weights of the neurons of the NN are complex. In other aspects, the input to the NN can be a real number and the I and Q values of the sample can be treated separately, such as by separate dimensions of a vector or separate inputs. An NN that includes complex weights and receives complex inputs can be more efficient in terms of the number of neurons, compute time, or power consumption, as compared to the NN(s) that operate on real samples.

A wavelet coefficient of the I-Q sample can provide an indication of time domain modulation or frequency domain modulation technique, since the wavelet coefficient is a time-frequency localized basis projection. A wavelet coefficient of the FFT of the I-Q sample can be helpful to detect a frequency hopping modulation scheme (e.g., frequency hopped spread spectrum (FHSS)) as the wavelet coefficient is localized in frequency and time. A projection onto a standard code can help identify code division multiple access (CDMA) like modulation schemes wherein the signal is modulated over a code. The memory 110 or other memory device can include standard codes that are used. A projection of the signal onto one of these standard codes might provide a better feature set for identification.

One or more aspects can help detect a never before seen PHY layer circuitry parameter. For example, a subcarrier spacing not currently supported by the Institute of Electronic and Electrical Engineers (IEEE) 802.11 or other wireless communication standard, a coding scheme not currently known, a custom signal, or a new FEC, among other PHY layer circuitry parameters. Using cascaded techniques of aspects, inference accuracy of a technique in the first layer can improve faster than a technique in a downstream layer.

In traditional ML/DL techniques, feature detection requires the same power consumption and/or inference time regardless of the type of input signal. Due to the nature of aspects, feature detection of some signals might require more power and/or latency than others depending on the techniques being used in a heterogeneous cascaded technique.

In one or more aspects, a CIRN interference pattern can be predicted. Each node may monitor different frequency bands to identify the potential interference before transmission. Each node can learn an interference pattern in each frequency channel and take it into account in data transmission. Relevant features/spec of interference may be also identified such as: (i) direction: multiple input multiple output (MIMO) nodes may monitor different frequency channels in different directions. By directional measuring, the level of interference in each direction can be identified; (ii) correlation: The node may calculate the correlation of known nodes transmission scheduler with the received interference. All above parameters can be part of an interference pattern which can help data transmission in the best channel with minimized interference.

In some aspects, a collaboration channel (CC) can used for exchanging parameters and information between nodes as follows: (i) nodes can be directed to send a control packet in CC to signal their active frequency channels. A bit can be associated with each channel and can be set to one when the node is active. Other nodes can monitor these control packets to measure the activity in each channel. (ii) If one node continuously observes high level of interference in one channel, it can set a warning flag for that frequency channel in CC to warn other nodes; and (iii) If one node has a mission critical task, it may set a flag in CC to request a free channel from other nodes.

Figure 6:
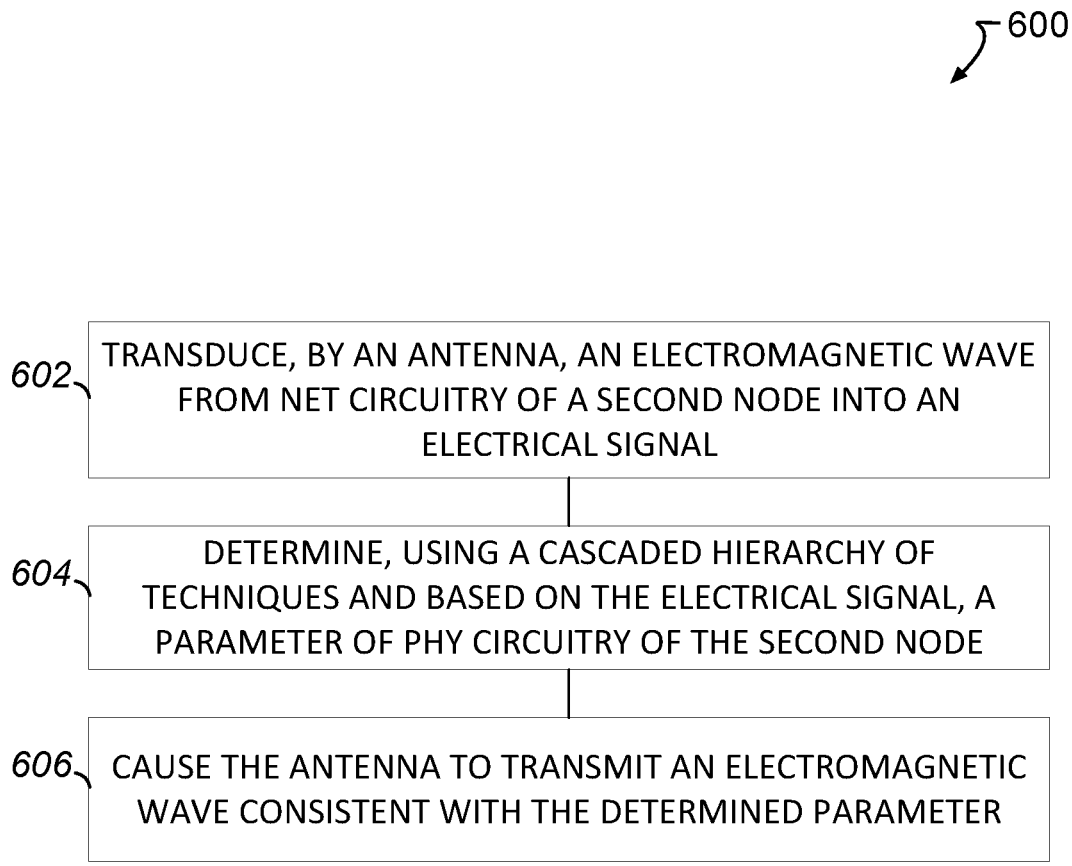
FIG. 6 illustrates, by way of example, a diagram of an aspect of a method for PHY parameter identification.

FIG. 6 illustrates, by way of example, a diagram of an aspect of a method 600 for PHY parameter identification. The method 600 can be performed by one or more of the nodes 102A-102C, 107A-107C. The method 600 as illustrated includes transducing, by the antenna 101, an electromagnetic wave (from the network circuitry 105) of a second node into an electrical signal, at operation 602; determining, based on the electrical signal, a parameter of the PHY layer circuitry 104 of the second node, at operation 604; and causing (by the network circuitry 105 and based on signals from processing circuitry 111), the antenna 101 to transmit an electromagnetic wave consistent with the determined parameter, at operation 606. The operation 604 can be implemented using the processing circuitry 111, such as by implementing a cascaded hierarchy of techniques.

The method 600 can further include, wherein the cascaded hierarchy of techniques includes layers of techniques including a first layer of one or more techniques, and a second layer of two or more techniques. The method 600 can further include, wherein the first layer is to identify a first parameter of the PHY layer circuitry based on the electrical signal and the second layer is to identify a second, different parameter of the PHY layer circuitry based on the first parameter and the electrical signal. The method 600 can further include, wherein the techniques include one or more machine learning techniques.

The method 600 can further include, wherein the first parameter is a modulation scheme. The method 600 can further include, wherein the second parameter is a modulation order. The method 600 can further include, wherein the layers of techniques further include a third layer of techniques to determine a third parameter of the PHY layer circuitry. The method 600 can further include, wherein the third parameter is a forward error correction scheme. The method 600 can further include, wherein only a subset of the techniques in the second layer operate on the electrical signal, the subset of the techniques determined based on the first parameter. The method 600 can further include training a technique of the techniques to identify a new parameter.

Figure 7:
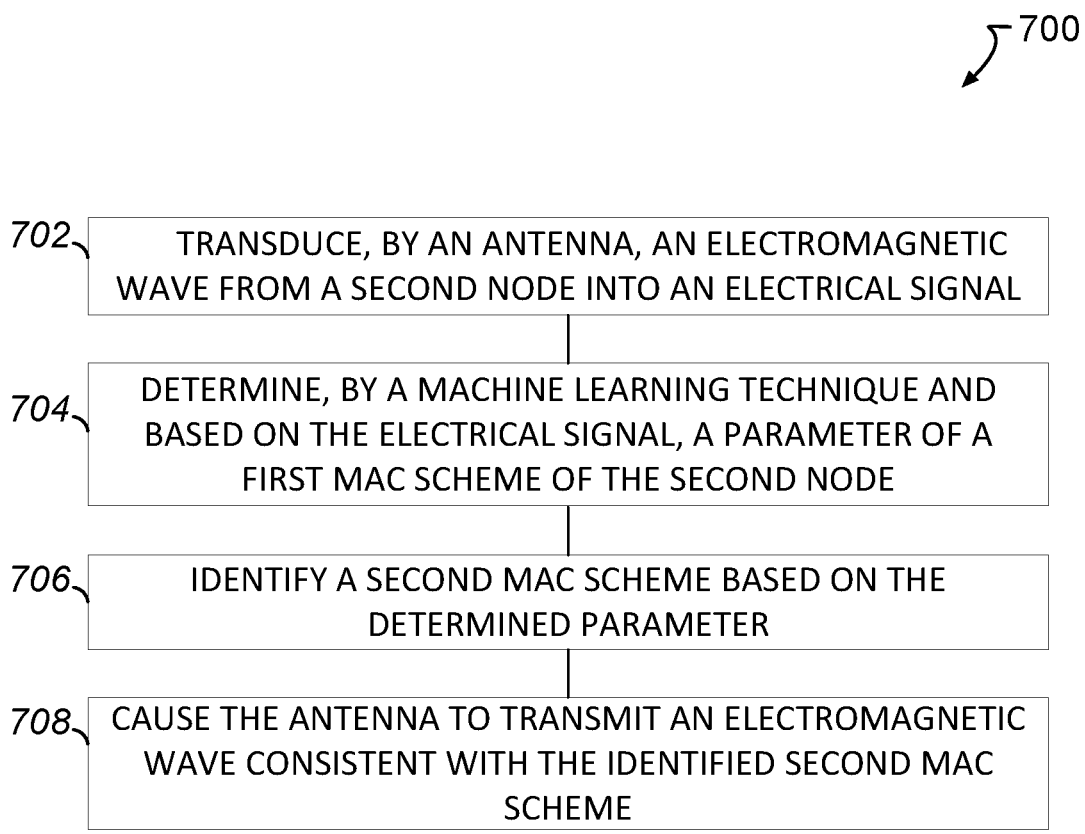
FIG. 7 illustrates, by way of example, a diagram of an aspect of a method for MAC scheme identification.

FIG. 7 illustrates, by way of example, a diagram of an aspect of a method 700 for MAC parameter identification. The method 700 can be implemented using one or more of the nodes 102A-102C, 107A-107C. The method 700 as illustrated includes transducing (by the antenna 101) an electromagnetic wave (from the network circuitry 105) of a second node into an electrical signal, at operation 702; determining, by processing circuitry configured to implement a machine learning technique and based on the electrical signal, a parameter of a first medium access control (MAC) scheme of the second node, at operation 704; identifying a second MAC scheme based on the determined parameter, at operation 706; and causing (by network circuitry 105) the antenna 101 to transmit an electromagnetic wave consistent with the identified second MAC scheme, at operation 708.

The method 700 can include, wherein the communication node is configured as a gateway through which communication to/from a first group of communication nodes including the wireless communication node to a second group of communication nodes must pass. The method 700 can further include, wherein each of the communication nodes in the first group of communication nodes is configured to communicate using a third MAC scheme different from the first and second MAC schemes.

The method 700 can further include, wherein the first parameter includes one or more of a code set arrangement indicating how the access codewords divide into subsets in a code division multiple access MAC scheme, a beamforming codeword subset indicating how the beamform vectors divide into subsets for a spatial access MAC scheme, and channel bandwidth access usage statistics. The method 700 can further include, wherein the network circuitry is configured to implement active probing by causing the antenna to transmit a second electromagnetic wave and provide the processing circuitry with electrical signals corresponding to a response to the to the second electromagnetic wave from the second node. The method 700 can further include, determining (by the processing circuitry 111) a performance score indicating a quality of communication between the wireless communication node and the second node and to adjust the MAC scheme implemented in response to a determined performance score below a specified threshold.

The method 700 can further include, wherein adjusting the MAC scheme includes an adjustment to a time for clear channel assessment, an adjustment to a backoff procedure, or an adjustment to a packet size/fragment. The method 700 can further include implementing the technique using a neural network. The method 700 can further include, wherein the MAC scheme includes a random-access scheme or a collision-free MAC scheme. The method 700 can further include, wherein an input to the machine learning technique includes at least one of (i) magnitudes of I and Q values of the electrical signal, (ii) a complex value corresponding to the I and Q values of the electrical signal, (iii) a Fast Fourier Transform of the electrical signal, (iv) a wavelet coefficient of the electrical signal, and (v) a projection of the electrical signal to a code.

Figure 8:
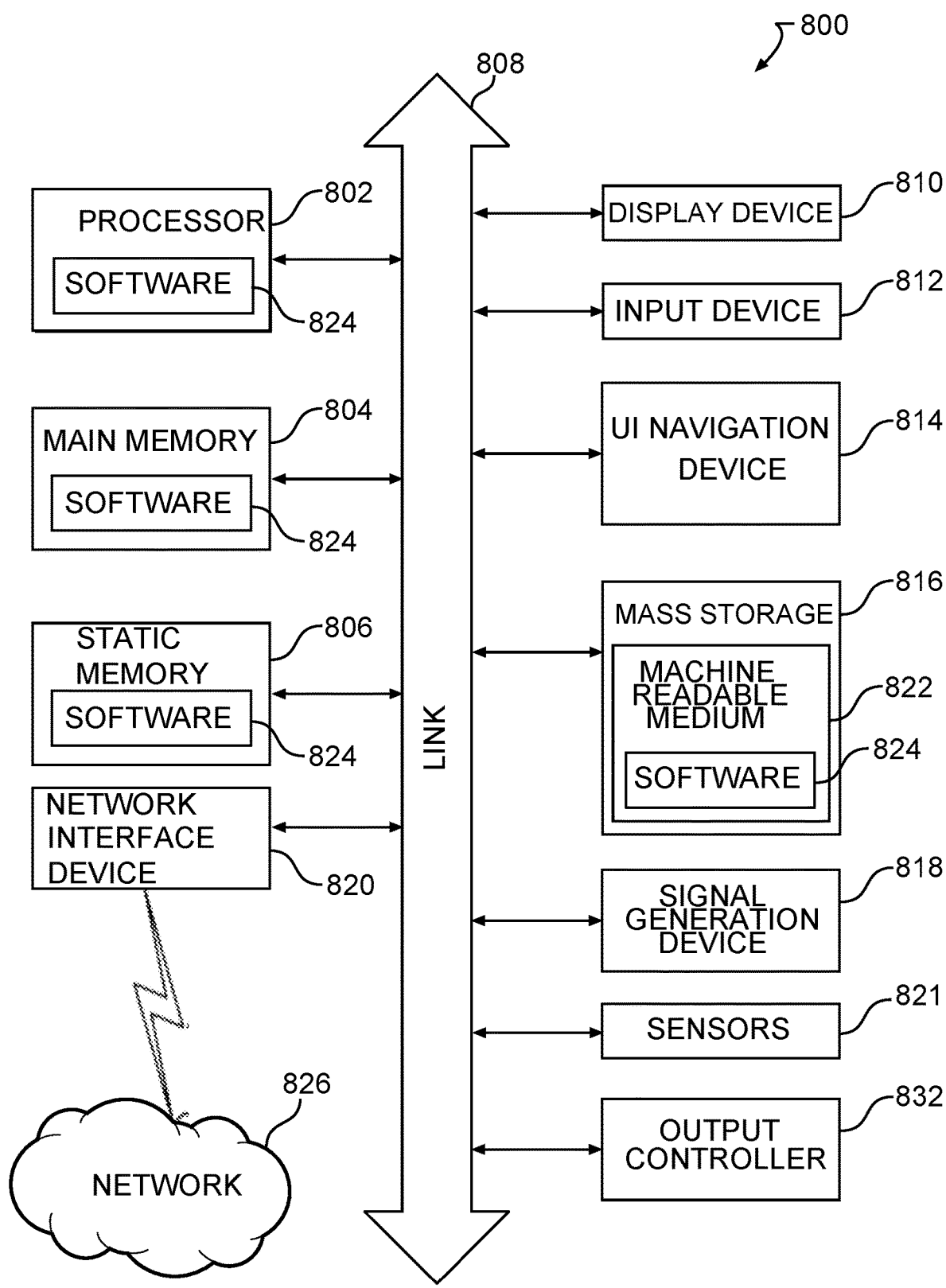
FIG. 8 is a block diagram illustrating a machine in the example form of a computer system, within which a set or sequence of instructions may be executed to cause the machine to perform any one of the methodologies discussed herein, according to an example aspect.

FIG. 8 is a block diagram illustrating a machine in the example form of a computer system 800, within which a set or sequence of instructions may be executed to cause the machine to perform any one of the methodologies discussed herein, according to an example aspect. For example, the method described above with reference to FIGS. 1-7 or techniques implemented by one or more of the nodes 102, 107 may be performed using at least a portion of the computer system 800.

In alternative aspects, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, an ADAS, an apparatus of an autonomous driving vehicle, a wearable device, a personal computer (PC), a tablet PC, a hybrid tablet, a personal digital assistant (PDA), a mobile telephone (e.g., a smartphone), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein. For instance, a portion of the computer system 800 may execute instructions to perform the method described above with reference to FIGS. 6-7.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display device 810, an input device 812 (e.g., an alphanumeric input device such as keyboard or keypad, a touchpad, a microphone, a camera, or components of a virtual reality/VR headset such as buttons), and a user interface (UI) navigation device 814 (e.g., a mouse, a stylus, or a pointing device). In one aspect, the video display device 810, input device 812 and UI navigation device 814 are incorporated into a touch screen display (e.g., a touch sensitive display device).

The computer system 800 may additionally include a storage device 816 (e.g., a drive unit), a signal generation device 818 (e.g., a speaker), a network interface device 820, and one or more sensors 821, such as an RFID reader, a global positioning system (GPS) sensor, a camera, a compass, an accelerometer, a gyrometer, a magnetometer, or other sensors. The computer system 800 may also include an output controller 832, such as a serial (e.g., universal serial bus (USB), parallel, or other wired or wireless (e.g., IR, near field communication (NFC), etc.) connection to communicate or control one or more peripheral devices (e.g., a printer, card reader, etc.). In some aspects, the processor 802 or instructions 824 (e.g., software in the example shown in FIG. 8) comprises processing circuitry or transceiver circuitry. The processing circuitry may include one or more electric or electronic components, such as one or more transistors, resistors, capacitors, inductors, diodes, regulators, analog to digital converters, digital to analog converters, logic gates (e.g., AND, OR, NAND, NOR, XOR, or other logic gates), multiplexers, modulators, switches, power supplies, or the like.

The storage device 816 includes a machine-readable medium 822 on which is stored one or more sets of data structures and instructions 824 (e.g., software) embodying or utilized by any one or more of the methodologies or functions described herein. For example, the computer system 800 may execute instructions 824 to perform the method described above with reference to FIGS. and 7.

The instructions 824 may also reside, completely or at least partially, within the main memory 804, static memory 806, or within the processor 802 during execution thereof by the computer system 800, with the main memory 804, static memory 806, and the processor 802 also constituting machine-readable media 822.

While the machine-readable medium 822 is illustrated in an example aspect to be a single medium, the term "machine-readable medium" may include a single medium or multiple media (e.g., a centralized or distributed database, or associated caches and servers) that store the one or more instructions 824. The term "machine-readable medium"

shall also be taken to include any tangible medium that is capable of storing, encoding or carrying instructions 824 for execution by the machine and that cause the machine to perform any one or more of the methodologies of the present disclosure or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The network interface device 820 may transmit and receive data over a transmission medium, which may be wired or wireless (e.g., radio frequency, infrared or visible light spectra, etc.), fiber optics, or the like, to network 826.

Network interface device 820, according to various aspects, may take any suitable form factor. In one such aspect, network interface device 820 is in the form of a network interface card (NIC) that interfaces with processor 802 via link 808. In one example, link 808 includes a PCI Express (PCIe) bus, including a slot into which the NIC form-factor may removably engage. In another aspect, network interface device 820 is a network interface circuit laid out on a motherboard together with local link circuitry, processor interface circuitry, other input/output circuitry, memory circuitry, storage device and peripheral controller circuitry, and the like. In another aspect, network interface device 820 is a peripheral that interfaces with link 808 via a peripheral input/output port such as a universal serial bus (USB) port.

EXAMPLES

Example 1 is a wireless communication node comprising an antenna to transduce an electromagnetic wave from network (NET) circuitry of a second node into an electrical signal, processing circuitry to implement a cascaded hierarchy of techniques to determine, based on the electrical signal, a parameter of physical (PHY) circuitry of the second node, and network circuitry to, based on signals from the processing circuitry, cause the antenna to transmit an electromagnetic wave consistent with the determined parameter.

In Example 2, Example 1 further includes, wherein the cascaded hierarchy of techniques includes layers of techniques including a first layer of one or more techniques, and a second layer of two or more techniques.

In Example 3, Example 2 further includes, wherein the first layer is to identify a first parameter of the PHY layer circuitry based on the electrical signal and the second layer is to identify a second parameter of the PHY layer circuitry based on the first parameter and the electrical signal, the second parameter different from the first parameter.

In Example 4, Example 3 further includes, wherein the techniques include one or more machine learning techniques.

In Example 5, at least one of Examples 1-4 further includes, wherein the first parameter is a modulation scheme.

In Example 6, Example 5 further includes, wherein the second parameter is a modulation order.

In Example 7, Example 6 further includes, wherein the layers of techniques further include a third layer of techniques to determine a third parameter of the PHY layer circuitry.

In Example 8, Example 7 further includes, wherein the third parameter is a forward error correction scheme.

In Example 9, at least one of Examples 2-8 further includes, wherein only a subset of the techniques in the second layer operate on the electrical signal, the subset of the techniques determined based on the first parameter.

In Example 10, at least one of Examples 1-9 further includes, wherein the processing circuitry is further to train a technique of the techniques to identify a new parameter.

Example 11 includes a wireless communication node comprising an antenna to transduce an electromagnetic wave from network (NET) circuitry of a second node into an electrical signal, processing circuitry to implement a machine learning technique to determine, based on the electrical signal, a parameter of a first medium access control (MAC) scheme of the second node, and identify a second MAC scheme based on the parameter, and network circuitry to cause the antenna to transmit an electromagnetic wave consistent with the identified second MAC scheme.

In Example 12, Example 11 further includes, wherein the wireless communication node is configured as a gateway through which communication to/from a first group of communication nodes including the wireless communication node to a second group of communication nodes must pass.

In Example 13, Example 12 further includes, wherein each of the communication nodes in the first group of communication nodes is configured to communicate using a third MAC scheme different from the first MAC scheme and the second MAC scheme.

In Example 14, at least one of Examples 11-13 further includes, wherein the first parameter includes one or more of a code set arrangement indicating how the access codewords divide into subsets in a code division multiple access MAC scheme, a beamforming codeword subset indicating how the beamform vectors divide into subsets for a spatial access MAC scheme, and channel bandwidth access usage statistics.

In Example 15, at least one of Examples 11-14 further includes, wherein the network circuitry is configured to implement active probing by causing the antenna to transmit a second electromagnetic wave and provide the processing circuitry with electrical signals corresponding to a response to the second electromagnetic wave from the second node.

In Example 16, at least one of Examples 11-15 further includes, wherein the processing circuitry is further to determine a performance score indicating a quality of communication between the wireless communication node and the second node and to adjust the MAC scheme implemented in response to a determined performance score below a specified threshold.

In Example 17, Example 16 further includes, wherein the adjustment to the MAC scheme include an adjustment to a time for clear channel assessment, an adjustment to a backoff procedure, or an adjustment to a packet size/fragment.

In Example 18, at least one of Examples 11-17 further includes, wherein the processing circuitry implements the machine learning technique using a neural network.

In Example 19, at least one of Examples 11-18 further includes, wherein the MAC scheme includes a random-access scheme or a collision-free MAC scheme.

In Example 20, at least one of Examples 11-19 further includes, wherein an input to the machine learning technique includes at least one of (i) magnitudes of I and Q values of the electrical signal, (ii) a complex value corresponding to the I and Q values of the electrical signal, (iii) a Fast Fourier Transform of the electrical signal, (iv) a wavelet coefficient of the electrical signal, and (v) a projection of the electrical signal to a code.

Example 21 includes at least one non-transitory machine-readable medium including instructions that, when executed by a first node, configure the first node to perform operations for determining a parameter of physical (PHY) layer circuitry, the operations comprising implementing a cascaded hierarchy of techniques to determine, based on an electrical signal from a second node, a parameter of PHY layer circuitry of the second node, and causing an antenna of the first node to transmit an electromagnetic wave consistent with the determined parameter.

In Example 22, Example 21 further includes, wherein the cascaded hierarchy of techniques includes layers of techniques including a first layer of one or more techniques, and a second layer of two or more techniques.

In Example 23, Example 22 further includes, wherein the first layer is to identify a first parameter of the PHY layer circuitry based on the electrical signal and the second layer is to identify a second parameter of the PHY layer circuitry based on the first parameter and the electrical signal, the second parameter different from the first parameter.

In Example 24, Example 23 further includes, wherein the techniques include one or more machine learning techniques.

In Example 25, Example 24 further includes, wherein the first parameter is a modulation scheme.

In Example 26, Example 25 further includes, wherein the second parameter is a modulation order.

In Example 27, Example 26 further includes, wherein the layers of techniques further include a third layer of techniques to determine a third parameter of the PHY layer circuitry.

In Example 28, Example 27 further includes, wherein the third parameter is a forward error correction scheme.

In Example 29, at least one of Examples 22-28 further includes, wherein only a subset of the techniques in the second layer operate on the electrical signal, the subset of the techniques determined based on the first parameter.

In Example 30, at least one of Examples 21-29 further includes, wherein the operations further comprise training a technique of the techniques to identify a new parameter.

Example 31 includes at least one non-transitory machine-readable medium including instructions that, when executed by a first node, configure the first node to perform operations for determining a medium access control (MAC) scheme, the operations comprising implementing a machine learning technique to determine, based on an electrical signal from a second node, a parameter of a first MAC scheme of the second node, and identify a second MAC scheme based on the parameter; and causing an antenna of the first node to transmit an electromagnetic wave consistent with the identified second MAC scheme.

In Example 32, Example 31 further includes, wherein the at least one machine-readable medium is part of a node configured as a gateway through which communication to/from a first group of communication nodes including the first node to a second group of communication nodes must pass.

In Example 33, Example 32 further includes, wherein each of the communication nodes in the first group of communication nodes is configured to communicate using a third MAC scheme different from the first MAC scheme and the second MAC scheme.

In Example 34, at least one of Examples 31-33 further includes, wherein the first parameter includes one or more of a code set arrangement indicating how the access codewords divide into subsets in a code division multiple access MAC scheme, a beamforming codeword subset indicating how the beamform vectors divide into subsets for a spatial access MAC scheme, and channel bandwidth access usage statistics.

In Example 35, at least one of Examples 31-34 further includes, wherein the operations further include implementing active probing by causing the antenna to transmit a second electromagnetic wave and receiving electrical signals corresponding to a response to the second electromagnetic wave from the second node.

In Example 36, at least one of Examples 31-35 further includes, wherein the operations further include determining a performance score indicating a quality of communication between the wireless communication node and the second node and to adjust the MAC scheme implemented in response to a determined performance score below a specified threshold.

In Example 37, Example 36 further includes, wherein the adjustment to the MAC scheme include an adjustment to a time for clear channel assessment, an adjustment to a backoff procedure, or an adjustment to a packet size/fragment.

In Example 38, at least one of Examples 31-37 further includes, wherein the machine learning technique is implemented using a neural network.

In Example 39, at least one of Examples 31-38 further includes, wherein the MAC scheme includes a random-access scheme or a collision-free MAC scheme.

In Example 40, at least one of Examples 31-39 further includes, wherein an input to the machine learning technique includes at least one of (i) magnitudes of I and Q values of the electrical signal, (ii) a complex value corresponding to the I and Q values of the electrical signal, (iii) a Fast Fourier Transform of the electrical signal, (iv) a wavelet coefficient of the electrical signal, and (v) a projection of the electrical signal to a code.

Example 41 includes a method performed by a first node for determining a parameter of physical (PHY) layer circuitry of a second node, the method comprising implementing a cascaded hierarchy of techniques to determine, based on an electrical signal from a second node, a parameter of the PHY layer circuitry of the second node, and causing an antenna of the first node to transmit an electromagnetic wave consistent with the determined parameter.

In Example 42, Example 41 further includes, wherein the cascaded hierarchy of techniques includes layers of techniques including a first layer of one or more techniques, and a second layer of two or more techniques.

In Example 43, Example 42 further includes, wherein the first layer is to identify a first parameter of the PHY layer circuitry based on the electrical signal and the second layer is to identify a second parameter of the PHY layer circuitry based on the first parameter and the electrical signal, the second parameter different from the first parameter.

In Example 44, Example 43 further includes, wherein the techniques include one or more machine learning techniques.

In Example 45, Example 44 further includes, wherein the first parameter is a modulation scheme.

In Example 46, Example 45 further includes, wherein the second parameter is a modulation order.

In Example 47, Example 46 further includes, wherein the layers of techniques further include a third layer of techniques to determine a third parameter of the PHY layer circuitry.

In Example 48, Example 47 further includes, wherein the third parameter is a forward error correction scheme.

In Example 49, at least one of Examples 42-48 further includes, wherein only a subset of the techniques in the second layer operate on the electrical signal, the subset of the techniques determined based on the first parameter.

In Example 50, at least one of Examples 41-49 further includes training a technique of the techniques to identify a new parameter.

Example 51 includes a method performed by a first node for determining a medium access control (MAC) scheme, the method comprising implementing a machine learning technique to determine, based on an electrical signal from a second node, a parameter of a first MAC scheme of the second node, and identify a second MAC scheme based on the parameter, and causing an antenna of the first node to transmit an electromagnetic wave consistent with the identified second MAC scheme.

In Example 52, Example 51 further includes, wherein the first node is configured as a gateway through which communication to/from a first group of communication nodes including the first node to a second group of communication nodes must pass.

In Example 53, Example 52 further includes, wherein each of the communication nodes in the first group of communication nodes is configured to communicate using a third MAC scheme different from the first MAC scheme and the second MAC scheme.

In Example 54, at least one of Examples 51-53 further includes, wherein the first parameter includes one or more of a code set arrangement indicating how the access codewords divide into subsets in a code division multiple access MAC scheme, a beamforming codeword subset indicating how the beamform vectors divide into subsets for a spatial access MAC scheme, and channel bandwidth access usage statistics.

In Example 55, at least one of Examples 51-54 further includes implementing active probing by causing the antenna to transmit a second electromagnetic wave and receiving electrical signals corresponding to a response to the second electromagnetic wave from the second node.

In Example 56, at least one of Examples 51-55 further includes determining a performance score indicating a quality of communication between the wireless communication node and the second node and to adjust the MAC scheme implemented in response to a determined performance score below a specified threshold.

In Example 57, Example 56 further includes, wherein the adjustment to the MAC scheme include an adjustment to a time for clear channel assessment, an adjustment to a backoff procedure, or an adjustment to a packet size/fragment.

In Example 58, at least one of Examples 51-57 further includes, wherein the machine learning technique is implemented using a neural network.

In Example 59, at least one of Examples 51-58 further includes, wherein the MAC scheme includes a random-access scheme or a collision-free MAC scheme.

In Example 60, at least one of Examples 51-59 further includes, wherein an input to the machine learning technique includes at least one of (i) magnitudes of I and Q values of the electrical signal, (ii) a complex value corresponding to the I and Q values of the electrical signal, (iii) a Fast Fourier Transform of the electrical signal, (iv) a wavelet coefficient of the electrical signal, and (v) a projection of the electrical signal to a code.

Additional Notes:

The above detailed description includes references to the accompanying drawings, which form a part of the detailed description. The drawings show, by way of illustration, specific aspects that may be practiced. These aspects are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other aspects may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects may feature a subset of said features. Further, aspects may include fewer features than those disclosed in a particular example. Thus, the following claims are hereby incorporated into the Detailed Description, with a claim standing on its own as a separate aspect. The scope of the aspects disclosed herein is to be determined with reference to the appended claims, along with the full scope of equivalents to which such claims are entitled.

What is claimed is:

1. A wireless communication node comprising:
an antenna to transduce an electromagnetic wave from network (NET) circuitry of a second node into an electrical signal;
processing circuitry to implement a cascaded hierarchy of techniques to determine, based on the electrical signal, a parameter of physical (PHY) layer circuitry of the second node; and
network circuitry to, based on signals from the processing circuitry, cause the antenna to transmit an electromagnetic wave consistent with the determined parameter,
wherein the wireless communication node is configured as a gateway through which communication to/from a first group of communication nodes including the second node to a second group of communication nodes must pass.

2. The wireless communication node of claim 1, wherein the cascaded hierarchy of techniques includes layers of techniques including a first layer of one or more techniques, and a second layer of two or more techniques.

3. The wireless communication node of claim 2, wherein the first layer is to identify a first parameter of the PHY layer circuitry based on the electrical signal and the second layer is to identify a second parameter of the PHY layer circuitry based on the first parameter and the electrical signal, the second parameter different from the first parameter.

4. The wireless communication node of claim 3, wherein the techniques include one or more machine learning techniques.

5. The wireless communication node of claim 3, wherein the first parameter is a modulation scheme.

6. The wireless communication node of claim 5, wherein the second parameter is a modulation order.

7. The wireless communication node of claim 6, wherein the layers of techniques further include a third layer of techniques to determine a third parameter of the PHY layer circuitry.

8. The wireless communication node of claim 7, wherein the third parameter is a forward error correction scheme.

9. The wireless communication node of claim 2, wherein only a subset of the techniques in the second layer operate on the electrical signal, the subset of the techniques determined based on the first parameter.

10. The wireless communication node of claim 1, wherein the processing circuitry is further to train a technique of the techniques to identify a new parameter.

11. A wireless communication node comprising:
an antenna to transduce an electromagnetic wave from network (NET) circuitry of a second node into an electrical signal;
processing circuitry to implement a machine learning technique to determine, based on the electrical signal, a parameter of a first medium access control (MAC) scheme of the second node, and identify a second MAC scheme based on the parameter; and
network circuitry to cause the antenna to transmit an electromagnetic wave consistent with the identified second MAC scheme,
wherein the parameter includes one or more of a code set arrangement indicating how the access codewords divide into subsets in a code division multiple access MAC scheme, a beamforming codeword subset indicating how the beamform vectors divide into subsets for a spatial access MAC scheme, and channel bandwidth access usage statistics.

12. The wireless communication node of claim 11, wherein the wireless communication node is configured as a gateway through which communication to/from a first group of communication nodes including the wireless communication node to a second group of communication nodes must pass.

13. The wireless communication node of claim 12, wherein each of the communication nodes in the first group of communication nodes is configured to communicate using a third MAC scheme different from the first MAC scheme and the second MAC scheme.

14. The wireless communication node of claim 11, wherein the network circuitry is configured to implement active probing by causing the antenna to transmit a second electromagnetic wave and provide the processing circuitry with electrical signals corresponding to a response to the second electromagnetic wave from the second node.

15. The wireless communication device of claim 11, wherein the processing circuitry is further to determine a performance score indicating a quality of communication between the wireless communication node and the second node and to adjust the MAC scheme implemented in response to a determined performance score below a specified threshold.

16. The wireless communication device of claim 15, wherein the adjustment to the MAC scheme include an adjustment to a time for clear channel assessment, an adjustment to a backoff procedure, or an adjustment to a packet size/fragment.

17. The wireless communication node of claim 11, wherein the processing circuitry implements the machine learning technique using a neural network.

18. The wireless communication node of claim 11, wherein the MAC scheme includes a random-access scheme or a collision-free MAC scheme.

19. The wireless communication node of claim 11, wherein an input to the machine learning technique includes at least one of (i) magnitudes of I and Q values of the electrical signal, (ii) a complex value corresponding to the I and Q values of the electrical signal, (iii) a Fast Fourier Transform of the electrical signal, (iv) a wavelet coefficient of the electrical signal, and (v) a projection of the electrical signal to a code.

* * * * *